(12) United States Patent
Hanses et al.

(10) Patent No.: US 6,964,055 B2
(45) Date of Patent: Nov. 8, 2005

(54) SYSTEM AND METHOD FOR COMMUNICATING USING A FRAMEWORK

(75) Inventors: Philip C. Hanses, East Lansing, MI (US); Scott W. Woyak, Troy, MI (US); Steven J. Lundberg, Royal Oak, MI (US); Andrew W. Mather, Sterling Heights, MI (US); Jeffrey A. Van Eeuwen, Farmington Hills, MI (US); Philip C. Jackson, Jr., Troy, MI (US)

(73) Assignee: Electronic Data Systems Corporation, Plano, TX (US)

( * ) Notice: Subject to any disclaimer, the term of this patent is extended or adjusted under 35 U.S.C. 154(b) by 753 days.

(21) Appl. No.: 10/032,660

(22) Filed: Oct. 29, 2001

(65) Prior Publication Data

US 2003/0084199 A1 May 1, 2003

(51) Int. Cl.[7] .................................................. G06F 9/00
(52) U.S. Cl. ...................... 719/328; 719/331; 719/332; 717/116; 717/117; 707/101; 707/104.1
(58) Field of Search ..................... 719/310, 311, 328, 719/331; 707/1, 10, 100–104.1; 717/116–117

(56) References Cited

U.S. PATENT DOCUMENTS

| | | | |
|---|---|---|---|
| 6,480,860 B1 * | 11/2002 | Monday | 707/102 |
| 6,553,405 B1 * | 4/2003 | Desrochers | 709/203 |
| 6,769,123 B1 * | 7/2004 | Chan | 719/315 |
| 2002/0046240 A1 * | 4/2002 | Graham et al. | 709/203 |
| 2002/0120787 A1 * | 8/2002 | Shapiro et al. | 709/311 |

OTHER PUBLICATIONS

S. Zeiger "Servlet Essentials," novocode.com, XP-002265493, 23 pgs., Nov. 4, 1999.
"Struts User's Guide," aoindustries.com, XP-002265497, 16 pgs., Jul. 25, 2001.
"JDBC™ API Documentation," java.sun.com, XP-002265498 14 pgs., 1999.
"Coldjava's wireless tools (WAP Office Suite)," http://servletsuite.com, XP-002265499, 2 pgs.
M. Siddalingaiah, "Perspective on Technology: Java Servlet API and XML," javasoft.com, XP-002265500, 3 pgs., Aug. 15, 2000.

* cited by examiner

Primary Examiner—Meng-Al T. An
Assistant Examiner—Phuong N. Hoang
(74) Attorney, Agent, or Firm—Allen Scott Lineberry

(57) ABSTRACT

A method is provided that includes: receiving, by a framework, a request communicated by a source, the request including an associated functionality. The method also includes integrating, by an abstraction layer, a java object into the request such that a generic term associated with the request is generated. The generic term is insulated from the functionality of the request. The generic term is processed within the framework and a response associated with the request is returned to the source.

34 Claims, 2 Drawing Sheets

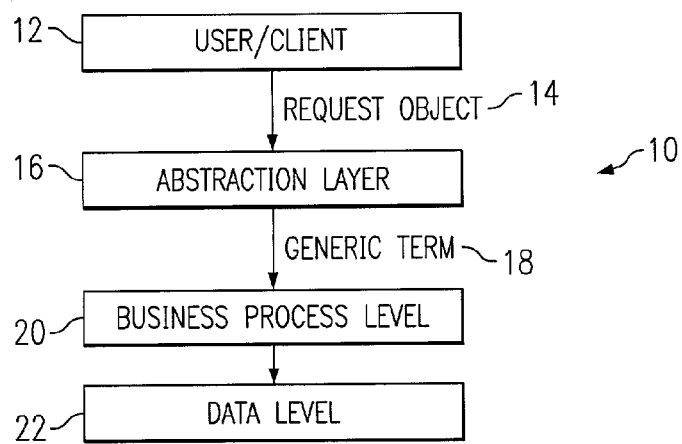
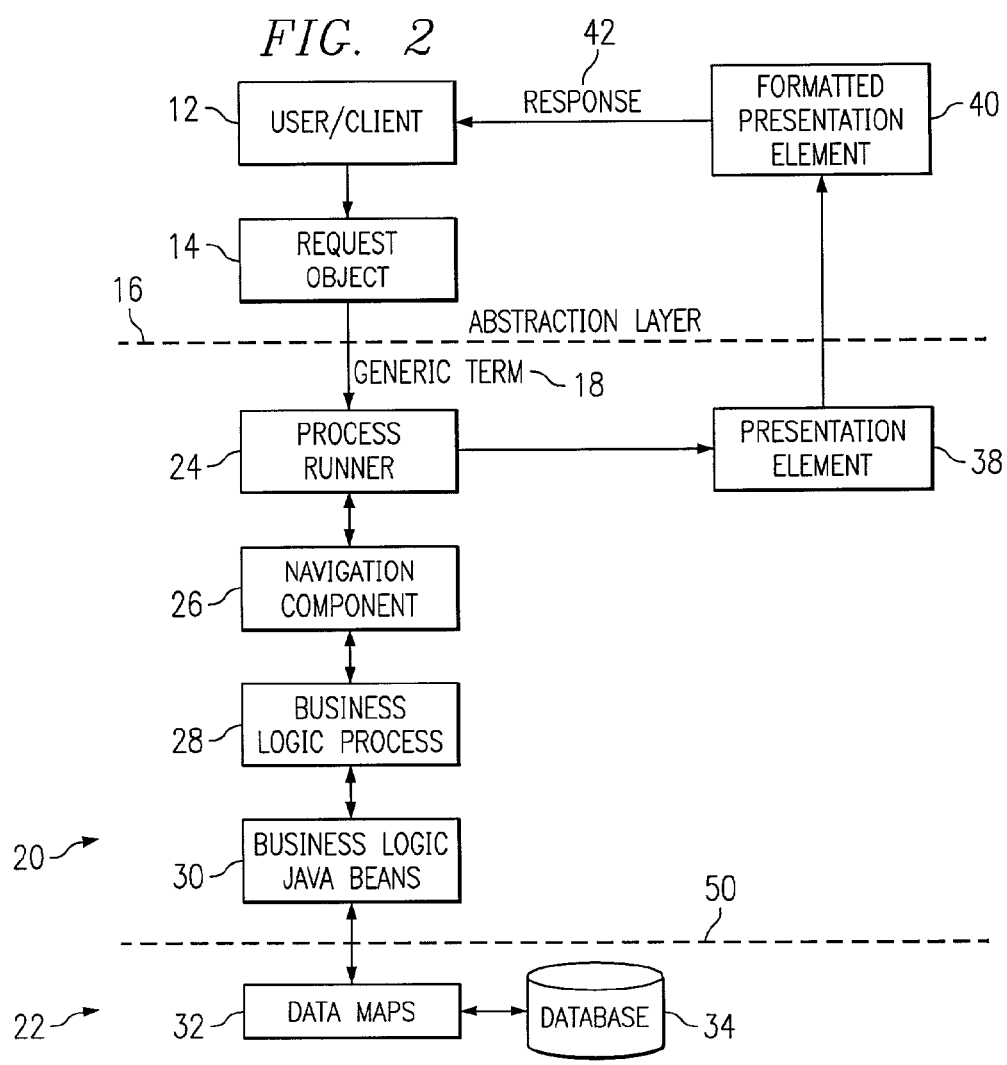

SYSTEM AND METHOD FOR COMMUNICATING USING A FRAMEWORK

TECHNICAL FIELD OF THE INVENTION

This invention relates in general to communication, and more particularly to a system and method for communicating using a framework.

BACKGROUND OF THE INVENTION

As the commercial significance of the Internet increases, business-to-consumer ("B2C"), business-to business ("B2B"), and other electronic networks have become increasingly more prevalent. Each electronic network typically involves a set of individuals, organizations, or businesses that communicate in order to carry our their operations. A participant in an electronic network may wish to initiate an action or simply communicate a message or a request that queries the network for information or data. The lack of a mechanism providing effective and efficient information exchange for these network participants can unduly restrain or even prohibit effective network communications and commerce.

SUMMARY OF THE INVENTION

From the foregoing, it may be appreciated that a need has arisen for a system and method for communicating that avoids some or all of the disadvantages of existing communication techniques.

According to one embodiment of the present invention, a method is provided to address this need. The method includes: receiving, by a framework, a request communicated by a source, the request including an associated functionality. The method also includes integrating a java object into the request such that a generic term associated with the request is generated. The generic term is insulated from the functionality of the request. The generic term is processed within the framework and a response associated with the request is returned to the source.

Embodiments of the present invention provide a number of technical advantages. One such technical advantage is that according to one embodiment of the present invention, the underlying functionality of a request may be shielded from an application server from which it was generated. This creates a transparency element with respect to the request and further allows the request to be processed within the framework irrespective of its associated point of origin.

Another technical advantage of one embodiment of the present invention is that modifications may be made to the framework, either in the business logic process or in the abstraction layer, in order to accommodate changes in any one of a number of parameters associated with the request. This avoids considerable time and effort that would have been expended in re-writing computer code correlating to, and consistent with, changes in the altered parameters of the request.

Other technical advantages may be readily apparent to one skilled in the art from the following figures, the descriptions, and the claims.

BRIEF DESCRIPTION OF THE DRAWINGS

A better understanding of the present invention will be realized from the detailed description which follows, taken in conjunction with the accompanying drawings in which:

FIG. 1 is a block diagram illustrating a framework in accordance with one embodiment of the present invention;

FIG. 2 is a block diagram illustrating additional details of the framework of FIG. 1 in accordance with one embodiment of the present invention.

DETAILED DESCRIPTION OF EXAMPLE EMBODIMENTS OF THE PRESENT INVENTION

Figure 3:
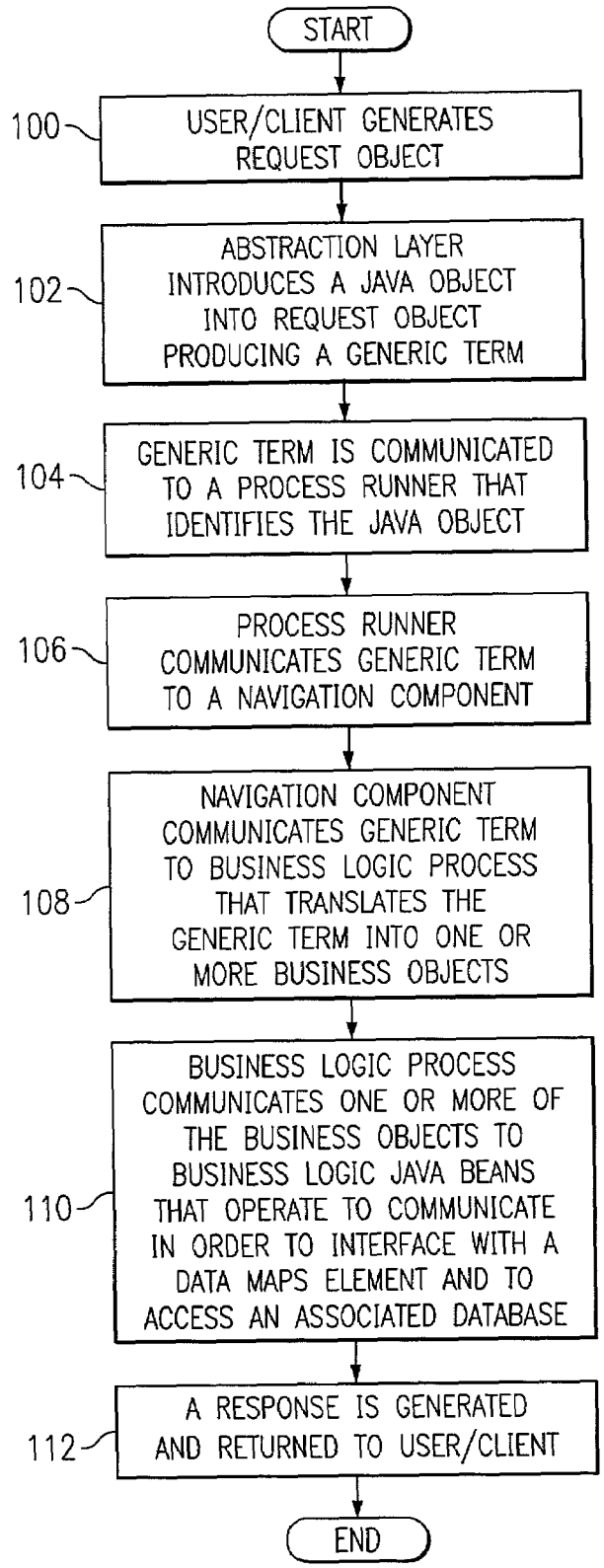
FIG. 3 is a flowchart illustrating a series of steps for processing a request within the framework of FIG. 1 in accordance with one embodiment of the present invention.

Example embodiments of the present invention and their advantages are best understood by referring now to FIG. 1 through FIG. 3 of the drawings in which like numerals refer to like parts.

FIGS. 1 and 2 illustrate a framework 10 that may be used generally in network communications. In accordance with one embodiment of the present invention, a user/client 12 generates a request object 14 that may operate to retrieve information or initiate an action. Request object 14 is communicated to an abstraction layer 16 within framework 10 where a java object may be integrated or otherwise introduced into request object 14. According to the teachings of the present invention, abstraction layer 16 generates a generic term 18 that comprises request object 14 and the java object; generic term 18 now includes a transparency element. The transparency element provides an insulating functionality that effectively eliminates potential processing within framework 10 based on an initial point of origin associated with request object 14.

Once the transparency element is established, generic term 18 may now be communicated to a business process level 20 where generic term 18 may be translated or otherwise converted into business logic. The business logic associated with generic term 18 may then pass from business process level 20 to a data level 22 where information associated with request object 14 may be retrieved, captured or otherwise accessed. The associated information may then be communicated in the form of a suitable response to user/client 12.

Referring to FIG. 1, user/client 12 is an end user at a terminal operable to generate request object 14 to be communicated within framework 10. Although described as an end user, user/client 12 may be any suitable point of origin or source that provides a request or a query to retrieve information or otherwise initiate an action within framework 10. User/client 12 may be an internet client, a computer program, a connection to a remote site, or any other suitable hardware or software operable to generate data to be communicated within framework 10.

Request object 14 is a hypertext transfer protocol (HTTP) request object according to one embodiment of the present invention. The HTTP request object is generally associated with a source, such as an application server, for example. Request object 14 represents a query having an associated lower level of Java 2 platform Enterprise Edition (J2EE), providing a component-based approach to the design, development, assembly, or deployment of enterprise applications. Request object 14 may be representative of a Windows client, an internet client, or any other suitable source or end point having an associated functionality and seeking to communicate with framework 10.

Generic term 18 comprises a portion of request object 14 and an accompanying java object according to the teachings of the present invention. The included java object is introduced to request object 14 at abstraction layer 16. The addition of the java object provides a transparency element, which functions to effectively untie request object 14 from (potentially) its associated application server. According to one embodiment of the present invention, placement of the java object operates to insulate an underlying functionality of request object 14 from its point of origin. Once the transparency is established, framework 10 may now process, execute or otherwise manipulate generic term 18. The java object of generic term 18 is mapped to the HTTP request and not request object 14, thus eliminating the need to identify an underlying application server or any other related and accompanying protocol associated with request object 14 generated by user/client 12.

Abstraction layer 16 is software that operates to integrate a java object with request object 14. This integration is reflected by generic term 18 as it is communicated from abstraction layer 16. Although described as software, abstraction layer 16 may be any code, set of instructions, hardware, component, or suitable protocol operable to position or otherwise introduce a java object to request object 14. Additionally, the present invention contemplates that abstraction layer 16 may be positioned at any point within or exterior to framework 10 and additionally that framework 10 may include several abstraction layers 16 operable to manipulate or otherwise modify request object 14 in order to facilitate processing of any communication generated by user/client 12.

Business process level 20 operates to process and to facilitate navigation of generic term 18. According to one embodiment of the present invention, business process level 20 receives generic term 18 from abstraction layer 16. Business process level 20 communicates generic term 18 to data level 22 for additional processing. Business process level 20 may comprise one or more elements that address the functionality of request object 14 and that may provide navigational or directional guidance to generic term 18. Additional details relating to business process level 20 are described below with reference to FIG. 2.

Data level 22 receives generic term 18 from business process level 20. According to the teachings of the present invention, data level 22 provides information (or access thereto) requested by user/client 12. Data level 22 may comprise any element operable to store, to capture, to access, or otherwise to communicate data within framework 10. Alternatively, data level 22 may communicate with an additional framework, storage unit, hardware, software, or any other suitable element operable to facilitate processing of generic term 18 within framework 10. Additional details relating to data level 22 are also provided below with reference to FIG. 2.

Turning to FIG. 2, details relating to framework 10 are illustrated in accordance to one embodiment of the present invention. Framework 10 includes a process runner 24 that operates to identify the java object included within generic term 18. Processor runner 24 may comprise a servlet associated with a J2EE implementation, for example. Thus according to the teachings of the present invention, instead of referring to an HTTP request object, process runner 24 may reference the java object within generic term 18, thereby obviating the need to identify an underlying application server associated with request object 14 generated by user/client 12. Although described as including a servlet, process runner 24 may include any suitable hardware, software, or code that operates to reference or otherwise identify the java object included within generic term 18. The present invention also contemplates that process runner 24 may be eliminated or otherwise bypassed entirely. For example, if user/client 12 attempted to communicate with an end code within framework 10, via request object 14, the associated business logic may be directly called or otherwise invoked. Thus, according to one embodiment of the present invention a direct communication may be made by user/client 12 to business process level 20, avoiding the utilization of process runner 24. Processor runner 24, after identifying the java object within generic term 18, may dynamically invoke a navigation component 26.

Navigation component 26 may record or otherwise monitor (for example, via an itemized history) the actions or commands invoked by request object 14. For instance, if framework 10 were implemented in order to facilitate communications through a website, and user/client 12 navigated through the website (exploring down through multiple levels of the website), all of the exploration would be captured by navigation component 26. Thus, according to the teachings of the present invention navigation component 26 may identify the origin of the action associated with request object 14 as well as its associated actions or commands that have been executed. This information provides navigation component 26 with the requisite information needed to enhance directional guidance provided to generic form 18. Navigation component 26 communicates generic term 18 to a business logic process 28.

Business logic process 28 may be dynamically invoked by navigation component 26 and operates to convert an underlying action associated with generic term 18 into business logic. The converted business logic may be any set of instructions, actions, or combination thereof that execute a command or task within framework 10. According to the teachings of the present invention, business logic process 28 may operate to link several business objects together in formulating an action or task to be executed within framework 10. For example, a credit card transaction to be processed within framework 10 may require that each field associated with the transaction is completed accurately. If a given field is missed, business logic process 28 (potentially working in combination with navigation component 26) may position user/client 12 in an appropriate place to correct or otherwise fill in a disputed field. Once completed, business logic process 28 may then return user/client 12 to the proper place in the transaction or alternatively to any other suitable destination within framework 10. This functionality eliminates the need to re-navigate through a website or repeat commands or steps previously completed by an end user, for example. Business logic process 28 may also impart a name to generic element 18 in order to facilitate identification of an associated action before a response is later presented to user/client 12. Business logic process 28 communicates with one or more business logic java beans 30 to facilitate processing of generic term 18 within framework 10.

One or more business logic java beans 30 may include one or more common services as designated by a web service designer, for example. Business logic java beans 30 may be particular to a protocol, such as J2EE implementation. Business logic java beans 30 comprises code which is generated in order to satisfy the needs of a particular request generated by user/client 12 to be processed within framework 10. Business logic java beans 30 may be called from any location within or exterior to framework 10, and business logic process 28 may be used to direct, to instruct or otherwise to facilitate the invocation of business logic java beans 30. Business logic java beans 30 may communicate with a data maps element 32 at data level 22.

Data maps element 32 may offer a communications interface between business logic java beans 30 and a database 34. Data maps 32 may comprise any suitable protocol or code operable to facilitate communications between database 34 and business logic java beans 30. Database 34 may store, or otherwise make accessible, information associated with request object 14 generated by user/client 12. Database 34 may include any information or data related to a command or action initiated by a user/client 12 and communicated to framework 10.

Once the appropriate information is selected or otherwise retrieved from database 34, the selected information may then be returned to business logic java beans 30, and relayed to business logic process 28. Business logic process 28 communicates the selected information to navigation component 26 where the information is then communicated on to process runner 24, which communicates the selected information to a presentation element 38.

According to the teachings of the present invention, the servlet included within process runner 24 receives the selected information from navigation component 26 and invokes presentation element 38 using a name that may be provided to the selected information by business logic process 28. Presentation element 38 determines all related data that is needed to build a suitable presentation or corresponding element to be submitted to user/client 12. For example, presentation element 38 may decide that a java server page (JSP) may be presented to user/client 12 in order to satisfy the original query generated via request object 14. Alternatively, presentation element 38 may invoke any other suitable page, protocol, (such as extensible mark up language (XML), HTTP, or any other appropriate protocol), element or object that corresponds to the query generated by user/client 12. Presentation element 38 may cooperate or otherwise communicate with a formatted presentation element 40 in order to generate a response 42 to be provided to user/client 12.

According to one embodiment of the present invention, formatted presentation element 40 may work in conjunction with presentation element 38 in order to communicate response 42 in a format native to user/client 12. The native format allows users/client 12 to manipulate or otherwise interpret response 42 once received. Alternatively, response 42 may be delivered to user/client 12 in any other suitable format or package where appropriate. Additionally, although described as facilitating the communication of response 42 to user/client 12, presentation element 38 and formatted presentation element 40 may be eliminated or otherwise bypassed entirely in processing generic term 18 within the framework 10. In such a case where both are circumvented, process runner 24 may deliver response 42 to user/client 12 in a raw data format or in any other data scheme according to particular needs.

According to another embodiment of the present invention, an additional abstraction layer 50 is provided between business logic java beans 30 and data maps 32 within framework 10 in order to introduce a java object to communication between business logic java beans 30 and data maps 32. Additional abstraction layer 50 may comprise software, hardware, code or any other suitable element operable to provide an appropriate interface between business logic java beans 30 and data maps 32.

Additional abstraction layer 50 operates in a similar fashion to that of abstraction layer 16 in providing a transparency element between business logic java beans 30 and data maps 32. As described above with reference to abstraction layer 16, additional abstraction layer 50 creates a layer of insulation between generic term 18, for example, and its underlying functionality. Thus, according to the teachings of the present invention generic term 18 may be identified or otherwise referenced by an additional java object created by additional abstraction layer 50. This insulating element provided by additional abstraction layer 50 may be appropriate where specific protocols or particular standards are used in communications between data maps 32 and database 34. Alternatively, the present invention contemplates that additional abstraction layer 50 may be positioned anywhere in framework 10 in order to provide a suitable interface between any two elements or structures. Multiple additional abstraction layers 50 may also be provided where appropriate, according to particular needs.

In operation, framework 10 facilitates processing of a communication initiated by user/client 12. FIG. 3 is a flowchart illustrating a series of steps for processing request object 14 in accordance with one embodiment of the present invention. Referring to FIG. 3, at a first step 100 user/client 12 generates request object 14 based on some command or action sought to be initiated by user/client 12. Request object 14 is then communicated to abstraction layer 16 where it may be converted to generic term 18, inclusive of a java object introduced into request object 14 at step 102. At step 104, generic term 18 is communicated to process runner 24 that operates to identify the java object included in generic term 18. According to one embodiment of the present invention, a servlet provided within process runner 24 operates to identify the java object included in generic term 18. Processor runner 24 then invokes navigation component 26 and communicates generic term 18 to navigation component 26 at step 106. Navigation component 26 monitors a potential history of actions or commands associated with generic term 18.

At step 108, navigation component 26 communicates generic term 18 to business logic process 28. Business logic process 28 translates generic term 18 into one of more business objects that may be linked together and that may also carry a name to be later invoked by presentation element 38. At step 110, business logic process 28 communicates one or more of the business objects to business logic java beans 30. Business logic java beans 30 interfaces with data maps 32 in order to access information within database 34. Once the selected information is retrieved from database 34 at step 110, the selected information may be translated back through framework 10. The selected information passes to business logic java beans 30 and on to business logic process 28.

According to one embodiment of the present invention illustrated generally at step 112, navigation component 26 receives communication associated with selected information from business logic process 28 and in turn communicates the information on to process runner 24. Process runner 24 invokes presentation element 38 and communicates the selected information to presentation element 38. Presentation element 38 and formatted presentation element 40 cooperate in order to generate a suitable response 42 to be communicated to user/client 12.

According to the teachings of the present invention, response 42 is received by user/client 12 in a format native to user/client 12. Alternatively, response 42 may be in any other suitable format according to particular needs. User/client 12 may then initiate a new request object or simply interpret response 42 for additional processing either within or exterior to framework 10. In the case where user/client 12 is a computer program, the computer program may receive the response and proceed to a next step that may involve implementing the response in a task.

According to one embodiment of the present invention at step 110, business logic java beans 30 may communicate generic term 18 to additional abstraction layer 50. Additional abstraction layer 50 may operate to introduce a (potentially additional) java object to generic term 18 in order to facilitate effective communication between data maps 32 and business logic java beans 30. As described above with reference to FIG. 2, additional abstraction layer 50 operates in a similar fashion to that of abstraction layer 16 in generating a java object to be placed in generic term 18. The additional java object may operate to provide a transparency element to generic term 18 with respect to communications between data maps 32 and database 34. This may be particularly beneficial where database 34 and/or data maps 32 is/are associated with a specific protocol or a designated format within framework 10. Once additional abstraction layer 50 provides an appropriate insulating functionality between business logic java beans 30 and data maps 32 or database 34, the selected information that is retrieved may then flow back through framework 10 and to user/client 12 in a similar fashion as described above in step 112.

Although several embodiments have been illustrated and described in detail, it will be understood that various substitutions and alterations can be made therein without departing from the present invention. For example, although FIGS. 1 through 3 illustrate abstraction layer 16 being designated at a particular processing layer within framework 10, abstraction layer 16 may be positioned anywhere within framework 10 in order to generally facilitate communications generated by user/client 12. Additionally, although abstraction layer 16 and additional abstraction layer 50 have been described with reference to single layers, multiple abstraction layers may be implemented in order to provide suitable interfacing capabilities, i.e. transparency elements, to one or more elements within framework 10. Additionally, the present invention contemplates that any one of a number of elements or objects illustrated in FIG. 2 (such as process runner 24, navigational component 26, business logic process 28, etc.) may be bypassed, or otherwise eliminated in part or entirely from framework 10 without departing from the intended scope of the present invention.

Numerous other changes, substitutions, variations, alterations, and modifications may be suggested to one skilled in the art, and it is intended that the present invention encompass all such changes, substitutions, variations, alterations, and modifications as falling within the spirit and scope of the appended claims.

What is claimed is:

1. An apparatus, comprising:
 a framework operable to process a request that is communicated by a source and that includes an associated functionality, wherein the framework includes an abstraction layer operable to integrate a java object into the request such that a generic term associated with the request is generated that is insulated from the functionality of the request, and wherein the generic term is processed within the framework such that a response associated with the request is returned to the source, wherein the framework includes a business logic process operable to translate a portion of the generic term into one or more business objects associated with an action to be executed within the framework and to facilitate processing of the generic term, and wherein the business logic process is further operable to link one or more of the business objects before communicating the business objects, wherein the business logic process is operable to direct navigation of the linked business objects to a step of a task to be completed in the framework, wherein the framework includes a process runner, the process runner comprising a servlet operable to identify the java object and to invoke navigation component operable to direct the request.

2. The apparatus of claim 1, wherein the business logic process may be modified in response to a variation in one or more parameters associated with the request.

3. The apparatus of claim 1, wherein the navigation component is operable to monitor the request and to store history associated with one or more actions associated with the request, the history being used to further direct the request.

4. The apparatus of claim 1, further comprising a database operable to store data associated with the request, the data being used to generate the response.

5. The apparatus of claim 4, wherein the framework includes an additional abstraction layer operable to insulate the generic term from a protocol associated with the database.

6. The apparatus of claim 5, further comprising a data maps element operable to provide an interface between the database and the generic term.

7. The apparatus of claim 1, wherein the source is a program that accesses the framework via a wireless device.

8. The apparatus of claim 1, wherein the abstraction layer may be modified in response to a variation in one or more parameters associated with the request.

9. The apparatus of claim 1, wherein the framework includes a presentation element operable to receive data associated with the request and formulate the response to be communicated to the source in a format native to the source.

10. A method to be performed in an electronic processing environment, comprising:
 receiving, by a framework, a request communicated by a source, the request including an associated functionality;
 integrating, by an abstraction layer, a java object into the request such that a generic term associated with the request is generated, the generic term being insulated from the functionality of the request;
 processing the generic term within the framework and returning a response associated with the request to the source, wherein the framework includes a process runner, the process runner comprising a servlet operable to identify the java object and to invoke a navigation component operable to direct the request;
 identifying the java object with a process runner that includes a servlet;
 invoking a navigation component with the servlet; and
 directing the request with the navigation component.

11. The method of claim 10, further comprising:
 invoking a business logic process that is operable to facilitate processing of the generic term;
 translating a portion of the generic term into one or more business objects associated with an action to be executed within the framework; and
 linking, by the business logic process, one or more of the business objects before communicating the business objects.

12. The method of claim 11, further comprising directing navigation of the linked business objects to a portion of a task to be completed in the framework.

13. The method of claim 12, further comprising modifying the business logic process in response to a variation in one or more parameters associated with the request.

14. The method of claim 10, further comprising:
monitoring the request and storing history associated with one or more actions that are associated with the request; and
directing the request to a destination within the framework based on the history associated with one or more of the actions.

15. The method of claim 10, further comprising storing data associated with the request in a database, the data being used to generate the response.

16. The method of claim 15, further comprising insulating the generic term from a protocol associated with the database with an additional abstraction layer.

17. The method of claim 16, further comprising providing an interface between the database and the generic term with a data maps element.

18. The method of claim 10, wherein the source is a program that accesses the framework via a wireless device.

19. The method of claim 10, further comprising modifying the abstraction layer in response to a variation in one or more parameters associated with the request.

20. The method of claim 10, further comprising:
receiving data from a database that is associated with the request; and
communicating, by a presentation element, the data to the source in a format native to the source.

21. Software embodied in a computer readable medium and operable to:
receive, by a framework, a request communicated by a source, the request including an associated functionality;
integrate, by an abstraction layer, a java object into the request such that a generic term associated with the request is generated, the generic term being insulated from the functionality of the request;
process the generic term within the framework and returning a response associated with the request to the source, wherein the framework includes a process runner, the process runner comprising a servlet operable to identify the java object and to invoke a navigation component operable to direct the request;
identify the java object with a process runner that includes a servlet;
invoke a navigation component with servlet; and
direct the request with the navigation component.

22. The software of claim 21, further operable to:
invoke a business logic process that is operable to facilitate processing of the generic term;
translate a portion of the generic term into business objects associated with an action to be executed within the framework; and
link, by the business logic process, one or more of the business objects before communicating the business objects.

23. The software of claim 22, further operable to direct navigation of the linked business objects to a portion of a task to be completed in the framework.

24. The software of claim 23, further operable to modify the business logic process in response to a variation in one or more parameters associated with the request.

25. The software of claim 21, further operable to:
monitor the request and store history associated with one or more actions that are associated with the request; and
direct the request to a destination within the framework based on the history associated with one or more of the actions.

26. The software of claim 21, further operable to store data associated with the request in a database, the data being used to generate the response.

27. The software of claim 26, further operable to insulate the generic term request from a protocol associated with the database with an additional abstraction layer.

28. The software of claim 27, further operable to provide an interface between the database and the generic term with a data maps element.

29. The software of claim 21, wherein the source is a program that accesses the framework via a wireless device.

30. The software of claim 21, further operable to modify the abstraction layer in response to a variation in one or more parameters associated with the request.

31. The software of claim 21, further operable to:
receive data from a database that is associated with the request; and
communicate, by a presentation element, the data to the source in a format native to the source.

32. A system for communicating, comprising:
means for receiving, by a framework, a request communicated by a source, the request including an associated functionality;
means for integrating a java object into the request such that a generic term associated with the request is generated, the generic term being insulated from the functionality of the request;
means for processing the generic term within the framework and returning a response associated with the request to the source, wherein the framework includes a process runner, the process runner comprising a servlet operable to identify the java object and to invoke a navigation component operable to direct the request,
means for invoking a business logic process that is operable to facilitate processing of the generic term;
means for translating a portion of the generic term into one or more business objects associated with an action to be executed within the framework; and
means for linking, by the business logic process, one or more of the business objects before communicating the business objects.

33. An apparatus, comprising:
a framework operable to process a request that is communicated by a source and that includes an associated functionality, the framework including an abstraction layer operable to integrate a java object into the request such that a generic term associated with the request is generated that is insulated from the functionality of the request, the generic term being processed within the framework such that a response associated with the request is returned to the source, wherein the framework includes a business logic process operable to translate a portion of the generic term into one or more business objects associated with an action to be executed within the framework and to facilitate processing of the generic term, the business logic process being further operable to link one or more of the business objects before communicating the business objects and to direct navigation of the linked business objects to a step of a task to be completed in the framework, and wherein the framework includes a process runner, the process runner comprising a servlet operable to identify the java object and to invoke a navigation component operable to direct the request, the navigation component being operable to monitor the request and to store history associated with one or more actions associated with the request, the history being used to further direct the request.

34. A method to be performed in an electronic processing environment, comprising:

receiving, by a framework, a request communicated by a source, the request including an associated functionality;

integrating, by an abstraction layer, a java object into the request such that a generic term associated with the request is generated, the generic term being insulated from the functionality of the request;

processing the generic term within the framework and returning a response associated with the request to the source;

invoking a business logic process that is operable to facilitate processing of the generic term;

translating a portion of the generic term into one or more business objects associated with an action to be executed within the framework;

linking, by the business logic process, one or more of the business objects before communicating the business objects;

directing navigation of the linked business objects to a portion of a task to be completed in the framework;

storing data associated with the request in a database, the data being used to generate the response; and providing an interface between the database and the generic term with a data maps element.

* * * * *